(12) United States Patent
van Rietschote et al.

(10) Patent No.: US 7,213,246 B1
(45) Date of Patent: *May 1, 2007

(54) FAILING OVER A VIRTUAL MACHINE

(75) Inventors: Hans F. van Rietschote, Sunnyvale, CA (US); Sachinrao C. Panemangalore, Maharashtra (IN); Mahesh Joshi, Maharashtra (IN); Sharad Srivastava, San Jose, CA (US)

(73) Assignee: Veritas Operating Corporation, Mountain View, CA (US)

( * ) Notice: Subject to any disclaimer, the term of this patent is extended or adjusted under 35 U.S.C. 154(b) by 705 days.

This patent is subject to a terminal disclaimer.

(21) Appl. No.: 10/108,882

(22) Filed: Mar. 28, 2002

(51) Int. Cl.
*G06F 9/455* (2006.01)
*G06F 12/00* (2006.01)

(52) U.S. Cl. .......................................... 718/1; 707/204

(58) Field of Classification Search ................ 719/318, 719/321; 711/159; 714/10; 718/1, 100; 709/1; 707/206, 204
See application file for complete search history.

(56) References Cited

U.S. PATENT DOCUMENTS

| | | | |
|---|---|---|---|
| 4,912,628 A | 3/1990 | Briggs | |
| 4,969,092 A | 11/1990 | Shorter | |
| 5,257,386 A | 10/1993 | Saito | |
| 5,408,617 A | 4/1995 | Yoshida | |
| 5,621,912 A | 4/1997 | Borruso et al. | |
| 5,852,724 A | 12/1998 | Glenn, II et al. | |
| 5,872,931 A | 2/1999 | Chivaluri | |
| 5,944,782 A | 8/1999 | Noble et al. | |
| 6,003,065 A | 12/1999 | Yan et al. | |
| 6,029,166 A | 2/2000 | Mutalik et al. | |
| 6,075,938 A | 6/2000 | Bugnion et al. | |
| 6,151,618 A | 11/2000 | Wahbe et al. | |
| 6,230,246 B1 | 5/2001 | Lee et al. | |
| 6,298,390 B1 | 10/2001 | Matena et al. | |
| 6,298,428 B1 | 10/2001 | Munroe et al. | |
| 6,324,627 B1 | 11/2001 | Kricheff et al. | |
| 6,341,329 B1 | 1/2002 | LeCrone et al. | |
| 6,363,462 B1 | 3/2002 | Bergsten | |
| 6,370,646 B1 * | 4/2002 | Goodman et al. | .......... 713/100 |

(Continued)

OTHER PUBLICATIONS

Kinshuk Govil, et al., "Cellular Disco: Resource Management Using Virtual Clusters on Shared-Memory Multiprocessors," 17th ACM Symposium on Operating Systems Principles (SOSP99), Published as Operating Systems Review 34(5):154-169, Dec. 1999, pp. 154-169.

(Continued)

*Primary Examiner*—Meng-Al T. An
*Assistant Examiner*—Camquy Truong
(74) *Attorney, Agent, or Firm*—Lawrence J. Merkel; Meyertons, Hood, Kivlin, Kowert & Goetzel, P.c.

(57) ABSTRACT

A first computer system may be configured to execute a first application in a first virtual machine. A second computer system may be coupled to the first computer system. In response to a failure, the first computer system is configured to failover the first virtual machine to the second computer system. A carrier medium comprises first instructions which, when executed, initiate a failover of a first virtual machine. An application executes on the first virtual machine. The failover occurs from a first computer system on which a failure occurs to a second computer system.

14 Claims, 11 Drawing Sheets

U.S. PATENT DOCUMENTS

| | | | |
|---|---|---|---|
| 6,397,242 | B1 | 5/2002 | Devine et al. |
| 6,421,739 | B1* | 7/2002 | Holiday ...................... 719/330 |
| 6,421,777 | B1 | 7/2002 | Pierre-Louis et al. |
| 6,438,642 | B1 | 8/2002 | Shaath |
| 6,493,811 | B1 | 12/2002 | Blades et al. |
| 6,496,847 | B1* | 12/2002 | Bugnion et al. ................ 718/1 |
| 6,542,909 | B1 | 4/2003 | Tamer et al. |
| 6,694,346 | B1 | 2/2004 | Aman et al. |
| 6,704,925 | B1 | 3/2004 | Bugnion |
| 6,711,672 | B1 | 3/2004 | Agesen |
| 6,718,538 | B1 | 4/2004 | Mathiske |
| 6,725,289 | B1 | 4/2004 | Waldspurger et al. |
| 6,735,601 | B1 | 5/2004 | Subrahmanyam |
| 6,754,781 | B2 | 6/2004 | Chauvel et al. |
| 6,757,778 | B1 | 6/2004 | van Rietschote |
| 6,763,440 | B1* | 7/2004 | Traversat et al. ........... 711/159 |
| 6,785,886 | B1 | 8/2004 | Lim et al. |
| 6,789,103 | B1 | 9/2004 | Kim et al. |
| 6,789,156 | B1 | 9/2004 | Waldspurger |
| 6,795,966 | B1* | 9/2004 | Lim et al. ...................... 718/1 |
| 6,799,316 | B1 | 9/2004 | Aguilar et al. |
| 6,802,062 | B1 | 10/2004 | Oyamada et al. |
| 6,961,806 | B1 | 11/2005 | Agesen et al. |
| 6,961,941 | B1 | 11/2005 | Nelson et al. |
| 7,069,413 | B1 | 6/2006 | Agesen et al. |
| 7,082,598 | B1 | 7/2006 | Le et al. |
| 7,089,377 | B1 | 8/2006 | Chen |
| 7,111,086 | B1 | 9/2006 | Ecoleston et al. |
| 7,111,145 | B1 | 9/2006 | Chen et al. |
| 7,111,481 | B2 | 9/2006 | Green et al. |
| 2001/0016879 | A1 | 8/2001 | Sekiguchi et al. |
| 2002/0049869 | A1 | 4/2002 | Ohmura et al. |
| 2002/0099753 | A1 | 7/2002 | Hardin et al. |
| 2002/0129078 | A1 | 9/2002 | Plaxton et al. |
| 2003/0028819 | A1* | 2/2003 | Chiu et al. ...................... 714/5 |
| 2003/0028861 | A1 | 2/2003 | Wallman et al. |
| 2003/0033431 | A1 | 2/2003 | Shinomiya |
| 2003/0097422 | A1 | 5/2003 | Richards et al. |
| 2003/0126242 | A1 | 7/2003 | Chang |
| 2004/0010787 | A1 | 1/2004 | Traut et al. |
| 2004/0268340 | A1 | 12/2004 | Steeb et al. |

OTHER PUBLICATIONS

Edouard Bugnion, et al., "Disco: Running Commodity Operating Systems on Scalable Multiprocessors," Computer Systems Laboratoy, Stanford, CA, 33 pages.
"White Paper, GSX Server," VMware, Inc., Dec. 2000, pp. 1-9.
"Vmware GSX Serve, The Server Consolidation Solution," VMware, Inc., 2001, 2 pages.
"Manage Multiple Worlds., From Any Desktop," VMware, Inc., 2000, 2 pages.
"VMware ESX Server, The Server Consolidation Solution for High-Performance Environments," VMware, Inc., 2001, 2 pages.
Melinda Varian, "VM and the VM Community: Past, Present, and Future," Operating Systems, Computing and Information Technology, Princeton Univ., Aug. 1997, pp. 1-67.
VERITAS, "Comparison: Microsoft Logical Disk Manager and VERITAS Volume Manager for Windows," May 2001, 4 pages.
VERITAS, "How VERITAS Volume Manager Complements Hardware RAID in Microsoft Server Environments," May 2001, pp. 1-7.
VERITAS, "VERITAS Volume Manager for Windows, Best Practices," May 2001, pp. 1-7.
Barrie Sosinky, Ph.D., "The Business Value of Virtual Volume Management, In Microsoft Window NT and Windows 2000 Netowrks," VERITAS, A white paper for administrators and planners, Oct. 2001, pp. 1-12.
VERITAS, "VERITAS Volume Manager for Windows NT," Version 27, 2001, 4 pages.
"BladeFram™ System Overview," Egenera, Inc., 2001 2 pages.
White Paper, "The Egenera™ Processing Area Network (PAN) Architecture," Egenera, Inc., 2002, 20 pages.
White Paper, "Emerging Server Architectures," Egenera, Inc., 2001, 12 pages.
White Paper, "Improving Data Center Performance," Egenera, Inc., 2001, 19 pages.
White Paper, "Guidelines for Effective E-Business Infrastructure Management," Egenera, Inc., 2001, 11 pages.
White Paper, "The Pros and Cons of Server Clustering in the ASP Environment," Egenera, Inc., 2001, 10 pages.
Position Paper, "Taking Control of The Data Center," Egenera, Inc., 2001, 4 pages.
Position Paper, "The Linux Operating System: How Open Source Software Makes Better Hardware," Egenera, Inc., 2001, 2 pages.
"Solution Overview," TrueSAN Networks, Inc., 2002, 7 pages.
"Simics: A Full System Simulation Platform," Reprinted with permission from Computer, Feb. 2002, © The Institute of Electrical and Electronics Engineering, Inc., pp. 50-58.
"Introduction to Simics Full-System Simulator without Equal," Virtutech, Jul. 8, 2002, 29 pages.
"The Technology of Virtual Machines," A Conneectix White Paper, Connectix Corp., 2001, 13 pages.
"The Technology of Virtual PC," A Conneectix White Paper, Connectix Corp., 2000, 12 pages.
"About LindowsOS," Lindows.com, lindows.com/lindows_products_lindowsos.php, 2002, 2 pages.
"Savannah: This is a Savannah Admin Documentation," Savannah, Free Software Foundation, Inc. © 2000-2002, 31 pages.
"Virtuozzo Basics," Virtuozzo, soft.com/en/products/virtuozzo/basics/, © 1994-2002 SWsoft, printed from web on Dec. 13, 2002, 2 pages.
"What is Virtual Environmnet(VE)?," SWsoft, http://www.sw-soft/en/products/virtuozzo/we/, © 1994-2002 SWsoft, printed from web on Dec. 13, 2002, 2 pages.
"Products," Netraverse, Inc, 2002, netraverse.com/products/index.php, printed from web on Dec. 13, 2002, 1 page.
"NeTraverse Win4Lin 4.0—Workstation Edition," Netraverse, Inc, 2002, netraverse.com/products/win4lin40/, printed from web on Dec. 13, 2002, 1 page.
"Win4Lin Desktop 4.0," Netraverse, Inc, 2002, netraverse.com/products/win4lin40/benefits.php, printed from web on Dec. 13, 2002, 1 page.
"Win4Lin Desktop 4.0," Netraverse, Inc, 2002, netraverse.com/products/win4lin40/features.php, printed from web on Dec. 13, 2002, 2 page.
"Win4Lin Desktop 4.0," Netraverse, Inc, 2002, netraverse.com/products/win4lin40/requirements.php, printed from web on Dec. 13, 2002, 2 page.
"Win4Lin Terminal Server 2.0," Netraverse, Inc, 2002, netraverse.com/products/wts, printed from web on Dec. 13, 2002, 1 page.
"Win4Lin Terminal Server 2.0," Netraverse, Inc, 2002, netraverse.com/products/wts/benefits.php, printed from web on Dec. 13, 2002, 1 page.
Win4Lin Terminal Server 2.0, Netraverse, Inc, 2002, netraverse.com/products/wts/features.php, printed from web on Dec. 13, 2002, 2 pages.
Win4Lin Terminal Server 2.0, Netraverse, Inc, 2002, netraverse.com/products/wts/requirements.php, printed from web on Dec. 13, 2002, 2 pages.
Win4Lin Terminal Server 2.0, Netraverse, Inc, 2002, netraverse.com/products/wts/technology.php, printed from web on Dec. 13, 2002, 1 page.
Win4Lin, Netraverse, Inc, 2002, netraverse.com/support/docs/Win4Lin-whitepapers.php, printed from web on Dec. 13, 2002, 5 pages.
"Virtual PC for Windows," Connectix, Version 5.0, 2002, 2 pages.
Dave Gardner, et al., "WINE FAQ,", © David Gardner 1995-1998, printed from www.winehq.org, 13 pages.
"Winelib User's Guide," Winelib, www.winehq.org, 26 pages.
John R. Sheets, et al. "Wine User Guide," www.winehq.org, pp. 1-53.
"Wine Developer's Guide," pages www.winehq.org, 1-104.
VMware, Inc., "VMware Control Center," 2003, 3 pages.

InfoWorld, Robert McMillan, "VMware Launches VMware Control Center," 2003, 2 pages.

VMware, Inc., "VMware Control Center: Enterprise-class Software to Manage Your Virtual Machines," 2003, 2 pages.

John Abbott, Enterprise Software, "VMware Heads Toward Utility Computing With New Dynamic Management Tools," Jul. 1, 2003, 4 pages.

Dejan S. Milogicic, et al., "Process Migration," Aug. 10, 1999, 49 pages.

Xian-He Sun, et al., "A Coordinated Approach for Process Migration in Heterogeneous Environments," 1999, 12 pages.

Kasidit Chanchio, et al., "Data Collection and Restoration for Heterogeneous Process Migration," 1997, 6 pages.

Kasidit Chanchio, et al., "A Protocol Design of Communication State Transfer for Distributed Computing," Publication date unknown, 4 pages.

SourceForge™, "Project: openMosix: Document Manager: Display Document," 14 pages.

OpenMosix, "The openMosix HOWTO: Live free() or die ()," May 7, 2003, 3 pages.

OpenMosix, "openMosix Documentation Wiki—don't," May 7, 2003, 2 pages.

Sapuntzakis, et al., "Optimizing the Migration of Virtual Computers," Proceedings of the Fifth Symposium on Operating Systems Design and Implementation, Dec. 2002, 14 pages.

Helfrich, et al., "Internet Suspend/Resume," ISR Project Home Page, 2003, 4 pages.

Kozuch, et al., "Internet Suspend/Resume," IRP-TR-02-01, Apr. 2002, Accepted to the Fourth IEEE Workshop on Mobile Computing Systems and Applications, Callicoon, NY, Jun. 2002, Intel Research, 9 pages.

Kozuch, et al., "Efficient State Transfer for Internet Suspend/Resume," IRP-TR-02-03, May 2002, Intel Research, 13 pages.

Tolia, et al., "Using Content Addressing to Transfer Virtual Machine State," IRP-TR-02-11, Summer 2002, Intel Research, 11 pages.

Flinn, et al., "Data Staging on Untrusted Surrogates" IRP-TR-03-03, Mar. 2003, Intel Research, To Appear in the Proceedings of the $2^{nd}$ USENIX Conference on File and Storage Technologies, San Francisco, 16 pages.

Tolia, et al., "Opportunistic Use of Content Addressable Storage for Distributed File Systems," IRP-TR-03-02, Jun. 2003, Intel Research, To Appear in the Proceedings of the 2003 USENIX Annual Technical Conference, San Antonio, TX, 16 pages.

Hansen, et al., "Nomadic Operating Systems," Dec. 10, 2002.

Kinshuk Govil, "Virtual Clusters: Resource Management on Large Shared-Memory Multiprocessors," Oct. 2000.

Constantine P. Sapuntzakis, et al., "Optimizing the Migration of Virtual Computer," Feb. 12, 2003.

Edouard Bugnion, et al., "Running Commodity Operating Systems on Scalable Multiprocessors", 1997.

* cited by examiner

FAILING OVER A VIRTUAL MACHINE

BACKGROUND OF THE INVENTION

1. Field of the Invention

This invention is related to the field of highly available computer systems and, more particularly, to the failing over of applications in computer systems, including clustered computer systems.

2. Description of the Related Art

Certain applications are often required to be available virtually uninterrupted, either 24 hours a day or at least during working hours. Various efforts have been undertaken to provide high availability services to support the high availability of such applications. Such highly-available applications may include email servers, web servers, database servers, etc.

Typically, efforts to provide high availability for a given application have focused on detecting that the application has failed and getting the application re-started. An application may fail due to an internal coding error in the application, an error in the operating system on which the application is running, an error in the hardware of the computer system on which the application is running, or a combination of any of the above errors. The errors may cause the application, or the operating system, to cease executing (e.g. a crash) or to stop functioning (e.g. a hang).

In some cases, each application for which high availability is desired may be assigned to a separate computer system. In this configuration, a failure of one application may not affect the operation of the other applications on the other computer systems. Additionally, this configuration allows for variations in the operating system on which the applications are run (e.g. different versions of the same operating system, or different operating systems). The cost of obtaining and maintaining separate computer systems for each application may be considerable.

Another method is to cluster a group of computer systems using specialized software (referred to as a cluster server) to control the group of computer systems. A given application may be executed on a first computer system of the group. The cluster server monitors the operation of the application and, if the cluster server detects that the application has failed, the cluster server may close the application on the first computer system and restart the application on another computer system. Typically, such cluster servers involve identifying, for each application supported by the cluster server, all of the state in the computer system that is needed to restart the application. In practice, such identification may be problematic and frequently involves making use of undocumented features of the application. Additionally, some applications may not function correctly when restarted on another machine. For example, the Exchange2000 application from Microsoft Corporation may not access a mailbox database used when the application was executing on another machine because Microsoft's Active Directory may identify that other machine as the owner of the database.

SUMMARY OF THE INVENTION

A computer system, carrier medium, and method for failing over a virtual machine are provided. A first computer system may be configured to execute a first application in a first virtual machine. A second computer system may be coupled to the first computer system. In response to a failure, the first computer system is configured to failover the first virtual machine to the second computer system. In one embodiment, failing over the first virtual machine may be accomplished using instructions comprising a program carried on a carrier medium. In one specific implementation, the program may include instructions which cause an image of a first virtual machine in which a first application is executing to be stored to a storage accessible to two or more computer systems in response to a failure of the first application on a first computer system of the two or more computer systems. Additionally, the instructions may activate a second virtual machine on the first computer system from the storage in response to receiving a message to failover the second virtual machine from another one of the computer systems.

In one particular implementation, cluster server software may be executing on the computer systems. The first virtual machine may be defined as a resource monitored by the cluster server software. The first virtual machine resource may be failed over in response to detection of a failure.

BRIEF DESCRIPTION OF THE DRAWINGS

The following detailed description makes reference to the accompanying drawings, which are now briefly described.

Figure 1:
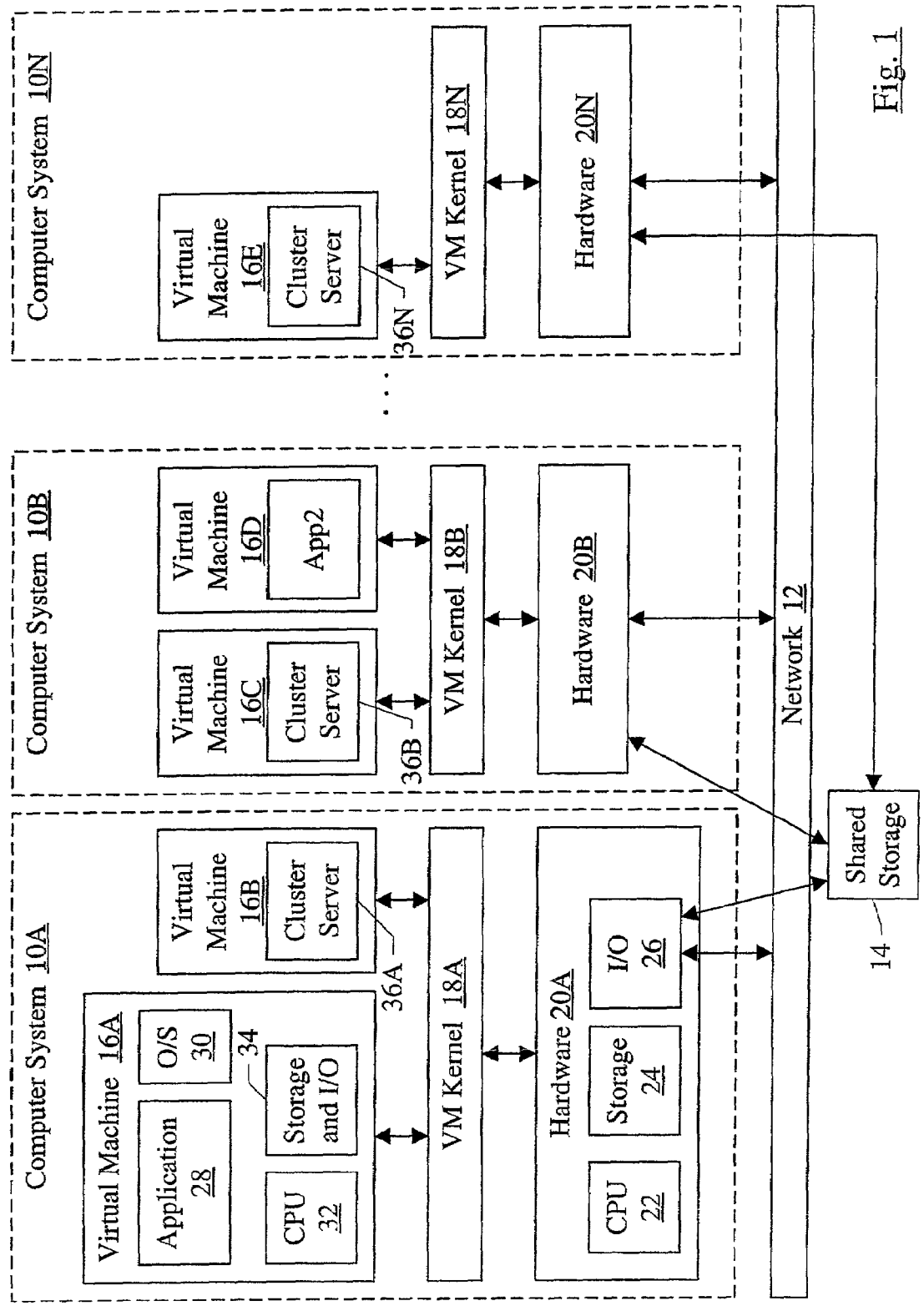
FIG. 1 is a block diagram of one embodiment of a cluster of computer systems.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating one embodiment of a cluster of computer systems. Other embodiments are possible and contemplated. In the embodiment of FIG. 1, the cluster includes computer systems 10A–10N, a network 12, and a shared storage device 14. The computer systems 10A–10N are each coupled to the network 12, and to the shared storage device 14. Each of the computer systems 10A–10N includes one or more virtual machines (e.g. virtual machines 16A–16B on the computer system 10A, virtual machines 16C–16D on the computer system 10B, and virtual machine 16E on the computer system 10N). The virtual machines are controlled by a virtual machine (VM) kernel (e.g. kernels 18A, 18B, and 18N in the computer systems 10A, 10B, and 10N, respectively). The virtual machines 16A–16E and the VM kernels 18A–18N may comprise software and/or data structures. The software may be executed on the underlying hardware in the computer systems 10A–10N (e.g. the hardware 20A, 20B, and 20N in the computer systems 10A, 10B, and 10N). The hardware may include any desired circuitry. For example, the hardware 20A is shown to include a processor, or central processing unit (CPU) 22, a storage 24, and input/output (I/O) circuitry 26. In some embodiments, a computer system may include multiple CPUs 22. Similarly, a virtual machine may comprise multiple virtual CPUs, in some embodiments.

As shown in FIG. 1, each application executing on the computer systems 10A–10N executes within a virtual machine 16A–16E. Generally, a virtual machine comprises any combination of software, one or more data structures in memory, and/or one or more files stored on the shared storage device 14. The virtual machine mimics the hardware used during execution of a given application. For example, in the virtual machine 16A, an application 28 is shown. The application 28 is designed to execute within the operating system (O/S) 30. Both the application 28 and the O/S 30 are coded with instructions executed by the virtual CPU 32. Additionally, the application 28 and/or the O/S 30 may make use of various virtual storage and virtual I/O devices 34. The virtual storage may represent any type of storage, such as memory, disk storage, tape storage, etc. The disk storage may be any type of disk (e.g. fixed disk, removable disk, compact disc read-only memory (CD-ROM), rewriteable or read/write CD, digital versatile disk (DVD) ROM, etc.). Each disk storage in the virtual machine may be mapped to a file on the shared storage device 14, to a file on any storage device accessible to the hardware 20A, or directly to a storage device accessible to the hardware 20A. A storage device may be accessible to the hardware 20A if the storage device is connected to the hardware 20A or if the storage device is coupled to a network to which the hardware 20A is coupled. For example, storage devices attached to a network may include network attached storage (NAS) or storage area network (SAN) devices, or IP-based storage devices of any type may be used. The virtual I/O devices may include any type of I/O devices, including modems, audio devices, video devices, network interface cards (NICs), universal serial bus (USB) ports, firewire (IEEE 1394) ports, serial ports, parallel ports, etc. Generally, each virtual I/O device may be mapped to a corresponding I/O device in the underlying hardware (e.g. the I/O circuitry 26) or may be emulated in software if no corresponding I/O device is included in the I/O circuitry 26.

The virtual machine in which an application is executing encompasses the entire system state associated with an application. Generally, when a virtual machine is active (i.e. the application within the virtual machine is executing), the virtual machine may be stored in the memory of the computer system on which the virtual machine is executing (although the VM kernel may support a paging system in which various pages of the memory storing the virtual machine may be paged out to local storage in the computer system) and in the files on the shared storage device 14 which are mapped to the virtual storage devices in the virtual machine. The VM kernel may support a command to suspend the virtual machine. In response to the command, the VM kernel may write an image of the virtual machine to the shared storage device 14, thus capturing the current state of the executing application. The image may include one or more files written in response to the suspend command, capturing the state of the virtual machine that was in memory in the computer system, as well as the files stored on the shared storage device 14 that represent the virtual disks included in the virtual machine. The state may include not only files written by the application, but uncommitted changes to files which may still be in the memory within the virtual machine, the state of the hardware (including the processor 32, the memory in the virtual machine, etc.) within the virtual machine, etc. Thus, the image may be a snapshot of the state of the executing application.

A suspended virtual machine may be resumed using a resume command supported by the VM kernel. In response to the resume command, the VM kernel may read the image of the suspended virtual machine from disk and may activate the virtual machine in the computer system.

An application may be failed over in the cluster of computer systems 10A–10N. If an application is detected as failing, the suspend command may be used to suspend the virtual machine in which the application is executing. Thus, the image of the virtual machine may be written to the shared storage device 14. Another computer system 10A–10N in the cluster may be selected to execute the application. The resume command may be used in the selected computer system 10A–10N to resume the virtual machine from the image on the shared storage device 14. In this manner, the application may begin executing on the selected computer system 10A–10N after experiencing a failure on the previous computer system 10A–10N. In this context, an application may fail due to an internal coding error in the application, an error in the operating system on which the application is running, an error in the virtual machine or the VM kernel on which the virtual machine is executing, an error in the hardware of the computer system on which the application is running, or a combination of any of the above errors. The errors may cause the application, or the operating system, to cease executing (e.g. a crash) or to stop functioning (e.g. a hang). It is noted that, in some embodiments, the computer systems 10A–10N may be configured to periodically checkpoint the virtual machines executing thereon, thus providing a set of possible images from which to resume when a failover occurs.

Since the state of the virtual machine is failed over from one computer system to another, the process of identifying which machine state is to be failed over with a given application may be avoided. Additionally, applications which may be dependent on the particular computer system on which they are executing (e.g. applications using Microsoft's Active Directory) may be failed over. Since the virtual machine in which the application executes is the same on any computer system on which it executes, the application appears to be executing on the same computer system. This appearance is independent of which actual computer system 10A–10N is executing the virtual machine including the application.

In the illustrated embodiment, cluster server software is used to manage the cluster and to failover applications (by failing over virtual machines). The cluster server software may be installed on each computer system 10A–10N in the cluster. For example, the cluster server software 36A may be installed on the computer system 10A, the cluster server software 36B may be installed on the computer system 10B, and the cluster server software 36N may be installed on the computer system 10N. The cluster server software on each computer system 10A–10N communicates with the other cluster server software on the other machines to manage the cluster, select computer systems to execute applications, monitor operation of the applications and underlying hardware to detect failures, and failover applications when a failure is detected. In one embodiment, the cluster server software also executes in a virtual machine. For example, in the embodiment of FIG. 1, the cluster server 36A executes in the virtual machine 16B, the cluster server 36B executes in the virtual machine 16C, and the cluster server 36N executes in the virtual machine 16E. In one implementation, the cluster server may operate similar to the Veritas Cluster Server™ product available from Veritas Software Corporation (Mountain View, Calif.).

The cluster server software may define various resources that it monitors and fails over a resource (or a group of dependent resources) if one of the resources are detected as failing. Resources may include software (e.g. applications, operating system software components, operating system services, etc.) and hardware (e.g. disk drives, network interface circuitry, etc.). In such embodiments, the virtual machine may be considered as a resource which may be failed over by the cluster server software. The number of resources associated with a given application may be reduced, since the virtual machine encompasses many software and hardware components that may have otherwise been tracked as separate resources by the cluster server software. The failing over of applications within virtual machines may be simpler than tracking the various resources separately.

The virtual hardware in the virtual machine 16A (and other virtual machines such as virtual machines 16B–16E) may be similar to the hardware 20A included in the computer system 10A. For example, the virtual CPU 32 may implement the same instruction set architecture as the processor 22. In such cases, the virtual CPU 32 may be one or more data structures storing the processor state for the virtual machine 16A. The application and O/S software instructions may execute on the CPU 22 when the virtual machine 16A is scheduled for execution by the VM kernel 18A. When the VM kernel 18A schedules another virtual machine for execution (e.g. the virtual machine 16B), the VM kernel 18A may write the state of the processor into the virtual CPU 32 data structure. Alternatively, the virtual CPU 32 may be different from the CPU 22. For example, the virtual CPU 32 may comprise software coded using instructions from the instruction set supported by the CPU 22 to emulate instruction execution according to the instruction set architecture of the virtual CPU 32. Alternatively, the VM kernel 18A may emulate the operation of the hardware in the virtual machine. Similarly, other virtual hardware may be emulated in software if not included in the hardware 20A.

Different virtual machines which execute on the same computer system 10A may differ. For example, the O/S 30 included in each virtual machine may differ. Different virtual machines may employ different versions of the same O/S (e.g. Microsoft Windows NT with different service packs installed), different versions of the same O/S family (e.g. Microsoft Windows NT and Microsoft Windows2000), or different O/Ss (e.g. Microsoft Windows NT, Linux, Sun Solaris, etc.).

Generally, the VM kernel may be responsible for managing the virtual machines on a given computer system. The VM kernel may schedule virtual machines for execution on the underlying hardware, using any scheduling scheme. For example, a time division multiplexed scheme may be used to assign time slots to each virtual machine. Additionally, the VM kernel may handle the suspending and resuming of virtual machines responsive to suspend and resume commands. The commands may be received from a virtual machine (e.g. the virtual machine in which the cluster server is executing). In one embodiment, the VM kernel may be the ESX product available from VMWare, Inc. (Palo Alto, Calif.).

In the illustrated embodiment, the VM kernel may execute directly on the underlying hardware (i.e. without an underlying operating system). In other embodiments, the VM kernel may be designed to execute within an operating system. For example, the GSX product available from VMWare, Inc. may execute under various versions of Microsoft's Windows operating system and/or the Linux operating systems.

The network 12 may comprise any network technology in various embodiments. The network 12 may be a local area network, wide area network, intranet network, Internet network, or any other type of network. The network 12 may be designed to be continuously available (although network outages may occur), or may be intermittent (e.g. a modem connection made between a computer system in a user's home and a computer system in a user's workplace). Any network protocol may be used. For example, the network 12 may be an Ethernet network. Alternatively, the network may be a token ring network, etc. Additionally, the network 12 may comprise shared storage or shared memory for communicating between the computer systems, in some embodiments.

The shared storage device 14 may be any type of storage device to which the computer systems 10A–10N may be coupled. For example, the shared storage device 14 may comprise one or more small computer system interface (SCSI) drives attached to a SCSI bus shared by the computer systems 10A–10N. Alternatively, the shared storage device 14 may couple to the network 12 (e.g. network attached storage (NAS) or storage area network (SAN) technologies may be used). The shared storage device may also comprise memory. Generally, the shared storage device 14 may be any device capable of storing data.

Figure 2:
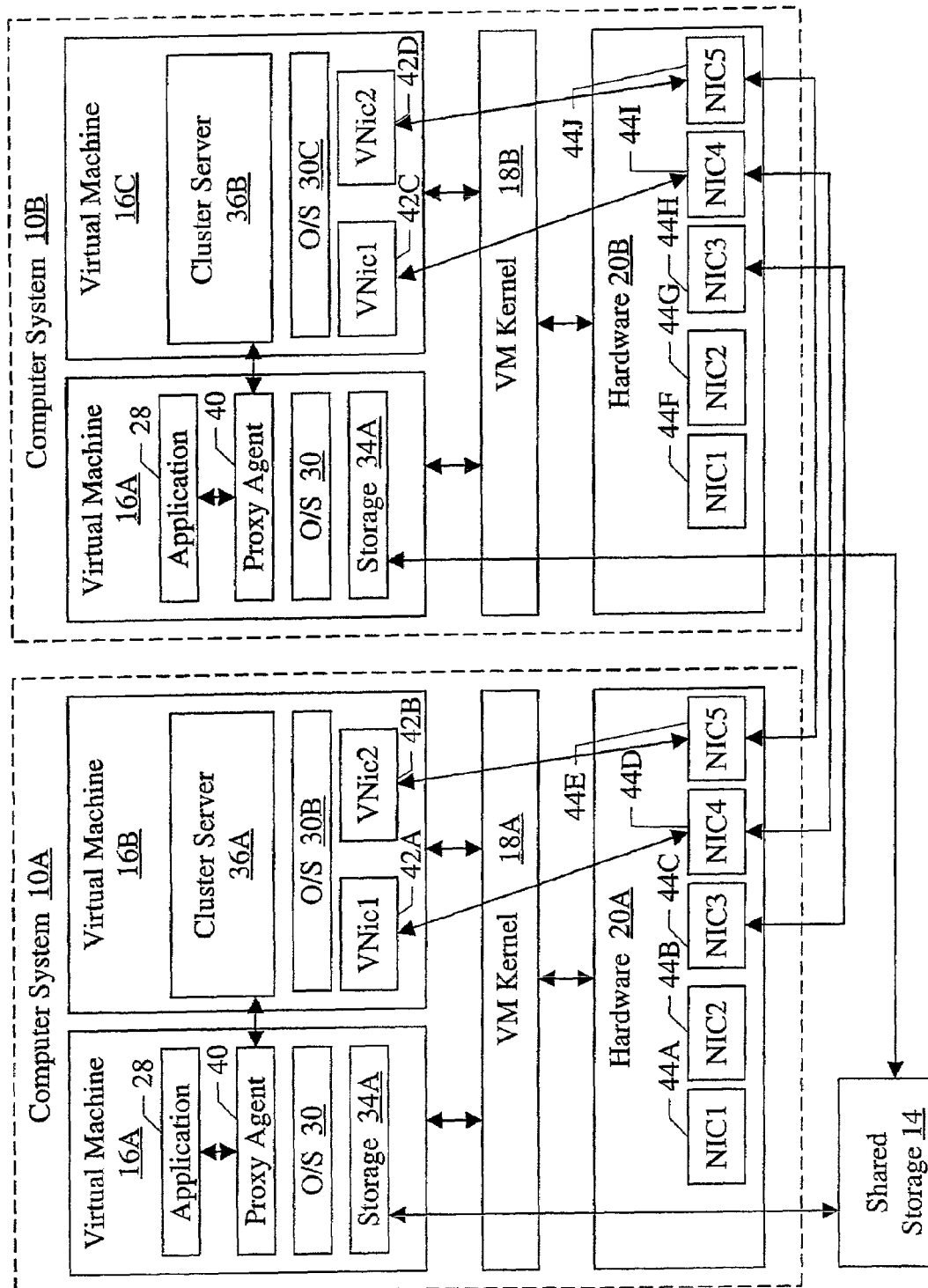
FIG. 2 is a block diagram of another embodiment of a cluster of computer systems.

Turning now to FIG. 2, a block diagram of a second embodiment of a cluster of computer systems is shown. Other embodiments are possible and contemplated. In the embodiment of FIG. 2, the cluster includes computer systems 10A and 10B. Other computer systems may be included, as desired, in the cluster. The cluster shown in FIG. 2 will be used as an example to highlight the failover of an application. As used herein, a failover refers to the starting of application execution on a different computer system in response to a failure of the application on a given computer system. In the illustrated embodiment, the computer system 10A includes the virtual machines 16A and 16B, the VM kernel 18A, and the hardware 20A, similar to the embodiment of FIG. 1. The virtual machine 16A includes the application 28, the O/S 30, and storage 34A (part of the storage and I/O 34). The storage 34A is mapped, by the VM kernel 18A, to the shared storage device 14. Additionally, the virtual machine 16A includes a proxy agent 40 configured to communicate with the cluster server 36A in the virtual machine 16B. The cluster server 36A may be designed to execute within an O/S 30B. Additionally, the virtual machine 16B may include a pair of virtual NICs 42A–42B. In the illustrated embodiment, the hardware 20A includes NICs 44A–44E. The virtual machine 16B is configured such that each of the virtual NICs 42A–42B are mapped by the VM kernel 18A to one of the NICs 44A–44E (e.g. the NICs 44D–44E, respectively, in this embodiment). The computer system 10B includes the virtual machine 16C, the virtual machine 16A with the same components as the computer system 10A includes, the VM kernel 18B, and the hardware 20B. The hardware 20B includes NICs 44F–44J. The virtual machine 16C includes the cluster server 36B, an O/S 30C, and virtual NICs 42C–42D which are mapped to two of the NICs 44F–44J (e.g. the NICs 44I and 44J, in this embodiment). The NICs 44E and 44J are coupled to communicate, as are the NICs 44D and 44I and the NICS 44C and 44H.

The virtual machine 16A may be active at any given time in only one of the computer systems 10A–10B. Since the image of the virtual machine 16A is stored on the shared storage device 14 in response to a suspend command, the virtual machine 16A may be executed on either computer system 10A–10B. If, for example, the virtual machine 16A is executing on the computer system 10A and a failure is detected, the virtual machine 16A may be failed over to the computer system 10B. Likewise, if the virtual machine 16A is executing on the computer system 10B and a failure is detected, the virtual machine 16A may be failed over to the computer system 10A. As mentioned previously, in some embodiments, multiple suspended images of the virtual machine may be maintained on the shared storage 14, and one of the checkpoint images may be selected for resuming the virtual machine in a failover. Additionally, in some embodiments, a failover may occur to the same computer system 10A–10B on which the failure occurred, if desired.

While the embodiment shown in FIG. 2 includes two computer systems, other embodiments may include more than two computer systems. If more than two computer systems are included, a computer system may be selected to be the receiver of a given failover. Various selection criteria may be used. For example, the cluster server may monitor the load on each computer system and select the computer system with the lowest current load for the failover. Alternatively, a fixed priority scheme or a round-robin scheme may be used.

The proxy agent 40 may be used to monitor the application 28, to detect any errors that may occur in the execution of the application. The proxy agent 40 may monitor the processes comprising the application 28 to see that the processes are active and consuming/releasing system resources properly. The proxy agent 40 may be configured to periodically make requests to the application 28 to determine if the application 28 responds properly. The proxy agent 40 may be configured to connect to defined ports of the application 28 to request status information on the application 28. In embodiments running on Microsoft's Windows operating system as the O/S 30, the proxy agent 40 may replicate the registry entries corresponding to the application 28 to the shared storage device 14. Alternatively, the registry entries may be copied from the virtual storage device of the failed virtual machine after the virtual machine is failed over.

The cluster server 36A may be configured to monitor the virtual machine 16A to detect any failures in the virtual machine as a whole. Particularly, in one embodiment, the cluster server 36A may ensure that the virtual machine 16A is active and may ping the IP address of the virtual machine 16A (e.g. the IP address of a virtual NIC in the virtual machine 16A). If the ping is successful, the cluster server 36A may connect to the proxy agent 40 to collect status information regarding the application 28. In some embodiments, the cluster server 36A may also be configured to reserve access to the shared storage device 14 when such access is desired.

While the illustrated embodiment includes the proxy agent 40 running within the virtual machine 16A, other embodiments may not include the proxy agent 40. For example, an application may be designed to communicate status information to the cluster server 36A directly.

The cluster server 36A and the cluster server 36B communicate using the virtual NICs 42A–42D. Two NICs may be used for each cluster server to provide redundancy, to allow the cluster servers to distinguish between a network error between the computer systems and an error within one of the computer systems. Other embodiments may use one NIC for each cluster server if redundancy is not desired. The communication between the cluster servers 36A–36B may include a "heartbeat" communication indicating that the sending computer system 10A–10B is still running. The heartbeat may be sent and checked at predetermined intervals. Alternatively, heartbeat information may be stored by each cluster server 36A–36B on a shared storage device or in shared memory, and the heartbeat information may be accessed from the shared storage device or memory as desired. Any mechanism for communicating heartbeat information among cluster servers 36A–36B may be used. Additionally, the communication may include status indicating the state of the system. A failover message may also be communicated, requesting the failover of a virtual machine in which an application experiences a failure.

The cluster server software in each computer system may monitor for the heartbeat communications from each other computer system. If the heartbeat communications from a given computer system cease, the cluster server software may conclude that the given computer system has failed. The cluster server software may attempt to suspend the virtual machines executing on the given computer system remotely. If successful, the suspended virtual machines may be resumed on another computer system. If not successful, the virtual machines on the given computer system may be restarted on other computer systems from a clean boot (or from one of the checkpoint images, in embodiments in which multiple images are maintained for a virtual machine on the shared storage device 14). While some state may be lost in such a case, the applications which experienced failure on the given computer system may be available for use.

The NICs 44C and 44H may be used for other communications between the computer systems 10A–10B. The remaining NICS 44A–44B and 44F–44G may be provided for use by the applications executing on the virtual machines within a given computer system 10A–10B. For example, an email server like Microsoft's Exchange2000 may use one or more NICs to receive requests to check email accounts.

Figure 3:
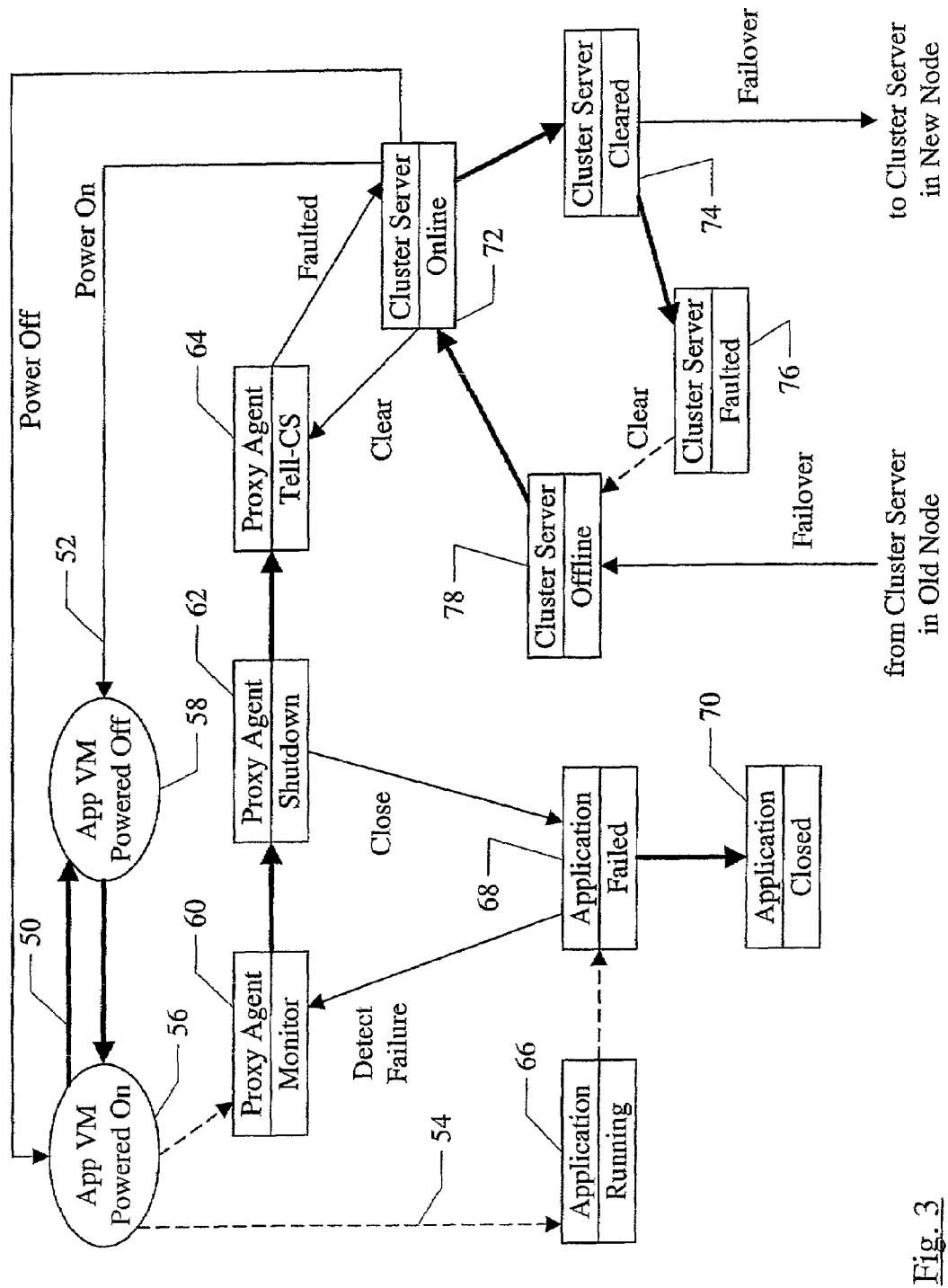
FIG. 3 is a state machine diagram illustrating operation of one embodiment of certain components shown in FIG. 2.

Turning next to FIG. 3, a state machine diagram is shown illustrating various states of one embodiment of the software illustrated in FIG. 2. Other embodiments are possible and contemplated. Thick lines (e.g. reference numeral 50) represent transitions between states. Thin lines (e.g. reference numeral 52) represent communication between software. Dashed lines (e.g. reference numeral 54) indicate state changes due to an external event or a state change in the source of the dashed line. The state machine will be described below with reference to the virtual machine 16A, the proxy agent 40, the application 28, and the cluster server 36A on the computer system 10A. Similar state machines may be used in other computer systems in the cluster. The virtual machine 16A has two states in the illustrated diagram: a powered on state 56 and a powered off state 58. The proxy agent 40 has three states in the illustrated diagram: a monitor state 60, a shutdown state 62, and a tell-CS state 64. The application 28 has three states in the illustrated diagram: a running state 66, a failed state 68, and a closed state 70. The cluster server 36A has four states in the illustrated diagram: an online state 72, a cleared state 74, a faulted state 76, and an offline state 78.

During normal operation, the virtual machine 16A is in the powered on state 56, the proxy agent 40 is in the monitor state 60, and the application 28 is in the running state 66. Generally, when the virtual machine 16A transitions to the powered on state, the proxy agent 40 is initialized in the monitor state 60 and the application is started (the running state 66). In the monitor state 60, the proxy agent monitors the application 28 to detect failures.

The application 28 transitions from the running state 66 to the failed state 68 in response to the occurrence of a failure. In the failed state 68, the application 28 is no longer running correctly. The application may be hung, may have crashed, or may have one or more services that have ceased operating. The proxy agent 40 detects the failure in the application 28, and transitions to the shutdown state 62.

In the shutdown state 62, the proxy agent 40 transmits a close message to the application 28. The application 28 transitions to the closed state 70 in response to the close message. Additionally, the proxy agent 40 transitions to the tell-CS state 64. The proxy agent remains in the tell-CS state 64 until contacted by the cluster server 36A (which is in the online state 72). The proxy agent 40 transmits a status of faulted to the cluster server 36A. The status may optionally include information identifying the fault, if desired.

In response to the faulted status from the proxy agent 40, the cluster server 36A transmits a power off message to the virtual machine 16A, causing the virtual machine 16A to transition from the powered on state 56 to the powered off state 58. The virtual machine 16A may be suspended (writing the image of the virtual machine 16A to the shared storage device 14) to allow failover of the virtual machine 16A to another computer system. Additionally, the cluster server 36A transitions to the cleared state 74.

In the cleared state 74, the cluster server 36A transmits a failover message to the cluster server in the computer system selected to execute the failed application (the "new node" in FIG. 3). The failover message may include the name of the virtual machine to be failed over, which may indicate the file or files on the shared storage device 14 that are used to establish the virtual machine in the new node. The cluster server 36A then transitions to the faulted state 76. While the cluster server 36A is in the faulted state 76, the state of the computer system 10A may remain frozen. New applications may not be started on the computer system 10A through the cluster server 36A. If the computer system 10A itself is the source of the failure, preventing new applications from running on the computer system 10A may prevent additional failures until the failure can be corrected. Additionally, by freezing the state of the computer system 10A, the state may be analyzed to determine the failure and if any correcting measures may be indicated.

The cluster server 36A transitions from the faulted state 76 to the offline state 78 in response to an external clear message. The clear message may be transmitted by a user, for example, after examining the computer system 10A to determine the cause of the failure. Alternatively, the clear message may be transmitted by the user without first examining the computer system to bring the computer system 10A back into eligibility for executing applications within the cluster.

In the offline state 78, the cluster server 36A may receive a failover message from another computer system in which a failure of an application has occurred (the "old node" in FIG. 3). In response to the failover message, the cluster server 36A transitions to the online state 72. From the online state 72, the cluster server transmits a power on message to the virtual machine 16A to cause the virtual machine 16A to be resumed. The power on may include transmitting the resume command to the VM kernel 18A. The virtual machine 16A powers up and is loaded with the state from the image of the virtual machine 16A on the shared storage device 14 (or from a selected image, if multiple checkpoint images are maintained). The proxy agent 40 is initialized to the monitor state 60. The application 28 is started (the running state 66).

It is noted that, while a state machine is shown in FIG. 3 with various states for various software included in the computer system 10A, the software may not formally be divided into states. Instead, the software may have various code sequences, delimited by branches which test for the causes of transitions shown in FIG. 3, and may progress to the next code sequence based on the results of the branches. Alternatively, each state may be a different routine with the code for executing that state and determining state transitions. Still further, the states of the application 28 may not describe different sections of the application 28, but rather its state of execution.

Turning now to FIGS. 4–10, a failover of an application from the computer system 10A to the computer system 10B is shown at various points in time during the failover. For each piece of software, the name is listed followed by its state (for the embodiment of FIG. 3) in parentheses.

Figure 4:
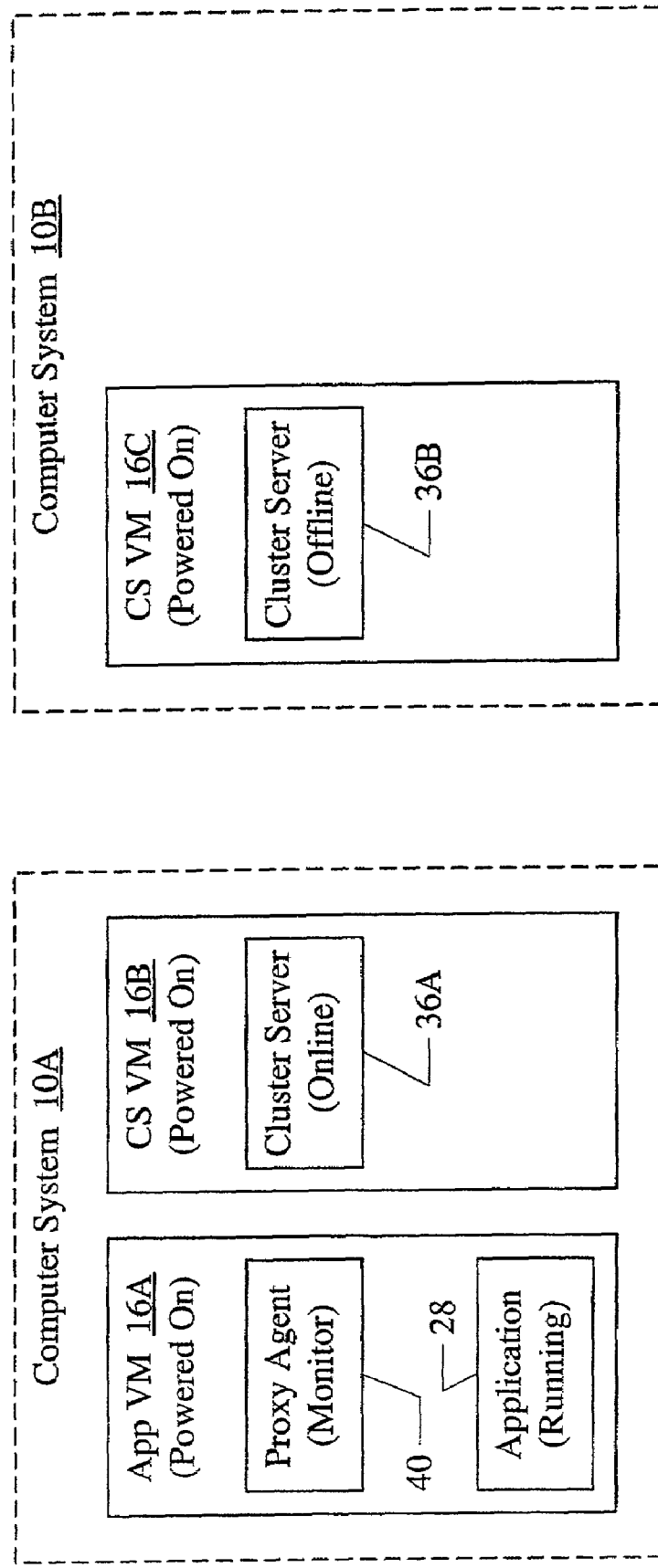
FIGS. 4–10 illustrate one embodiment of the cluster shown in FIG. 2 at various points during a failover of an application.

In FIG. 4, the computer system 10A is executing the virtual machine 16A including the application 28 and the proxy agent 40. The application 28 is in the running state 66, the proxy agent 40 is in the monitor state 60, and the virtual machine 16A is in the powered on state 56. The virtual machines 16B and 16C are in the powered on state as well. The cluster server 36A, executing within the virtual machine 16B, is in the online state 72. The cluster server 36B, executing within the virtual machine 16C, is in the offline state 78.

Figure 5:
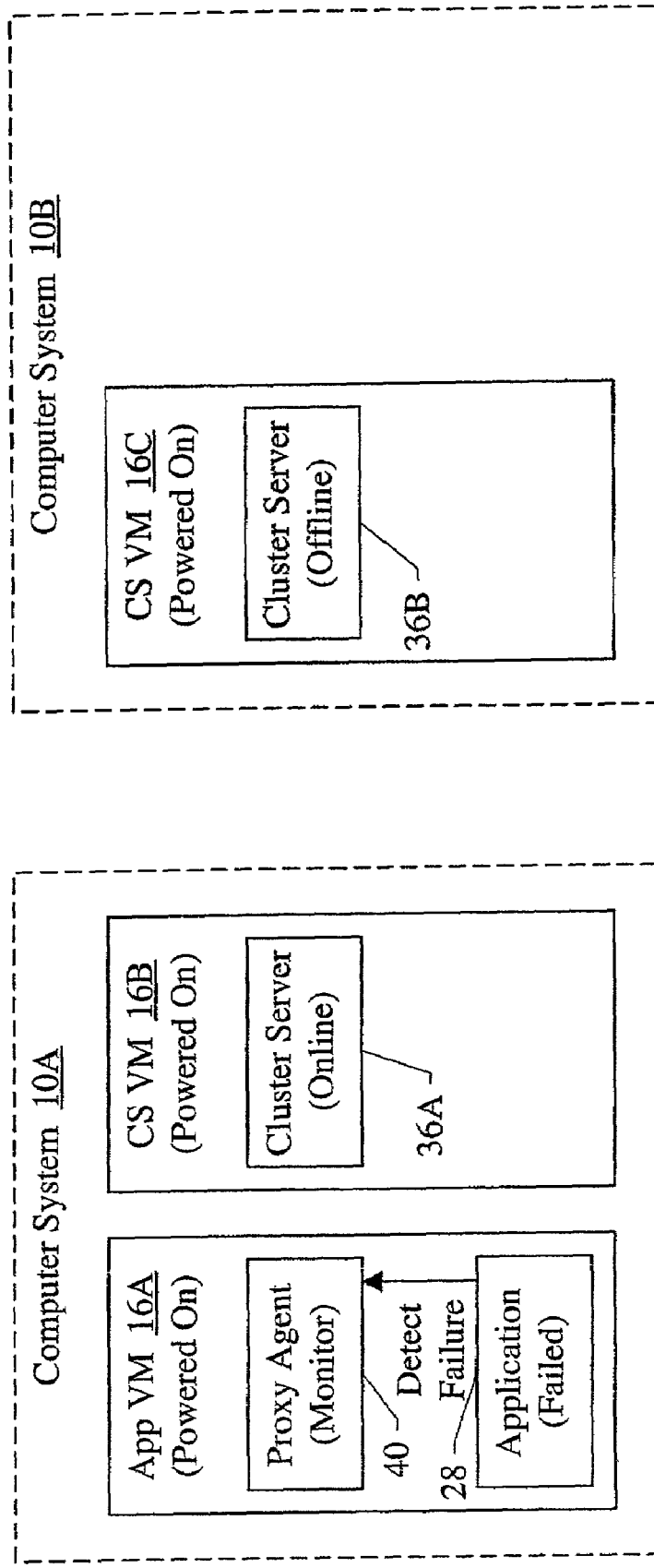
Figure 6:
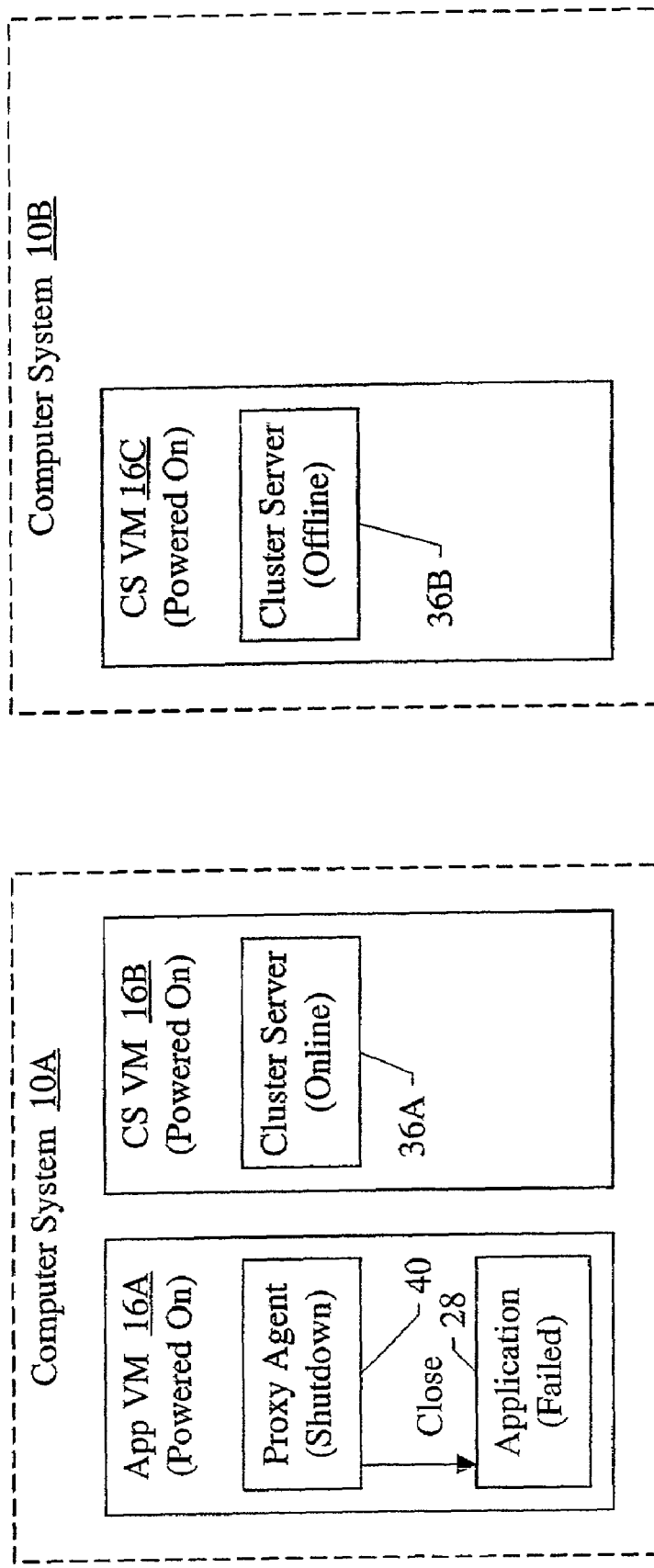
Figure 7:
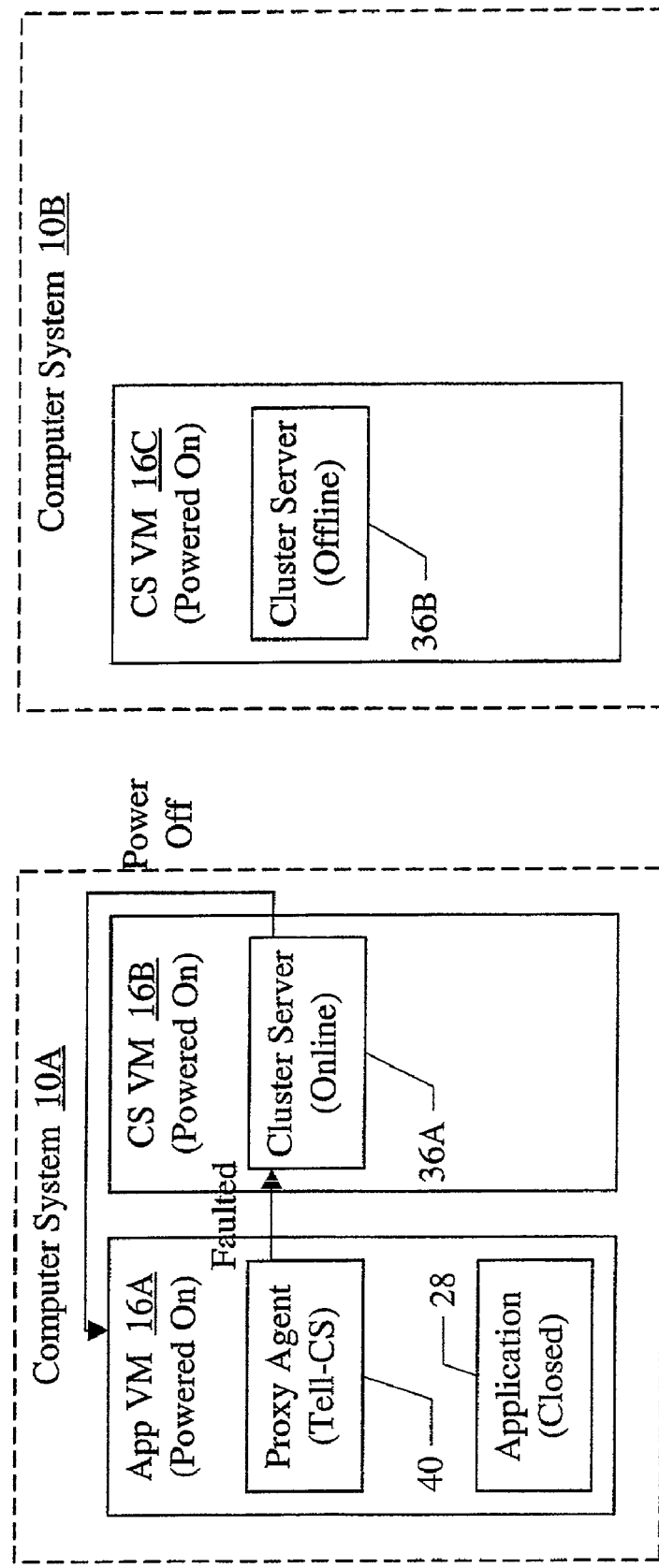

As illustrated in FIG. 5, the application 28 fails on the computer system 10A. Thus, the application 28 is in the failed state 68, and the proxy agent 40 detects the failure. In response to the failure, the proxy agent 40 transitions to the shutdown state 62 (FIG. 6). The proxy agent 40 transmits a close message to the application 28. As shown in FIG. 7, the application 28 transitions to the closed state 70 in response to the close message and the proxy agent 40 transitions to the tell-CS state 64. The cluster server 36A receives the faulted status from the proxy agent 40, and transmits a power off message to the virtual machine 16A in response.

Figure 8:
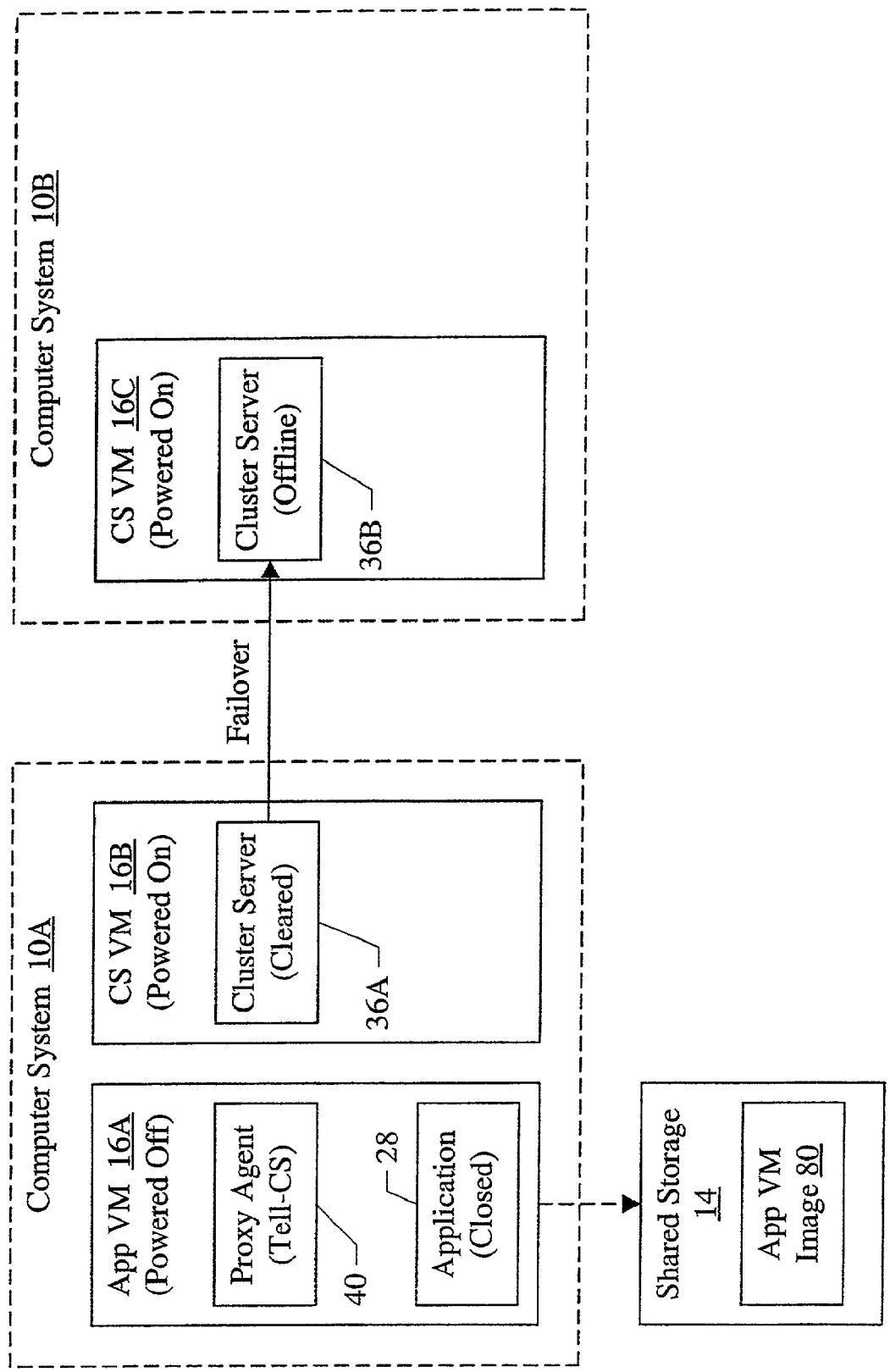
Figure 9:
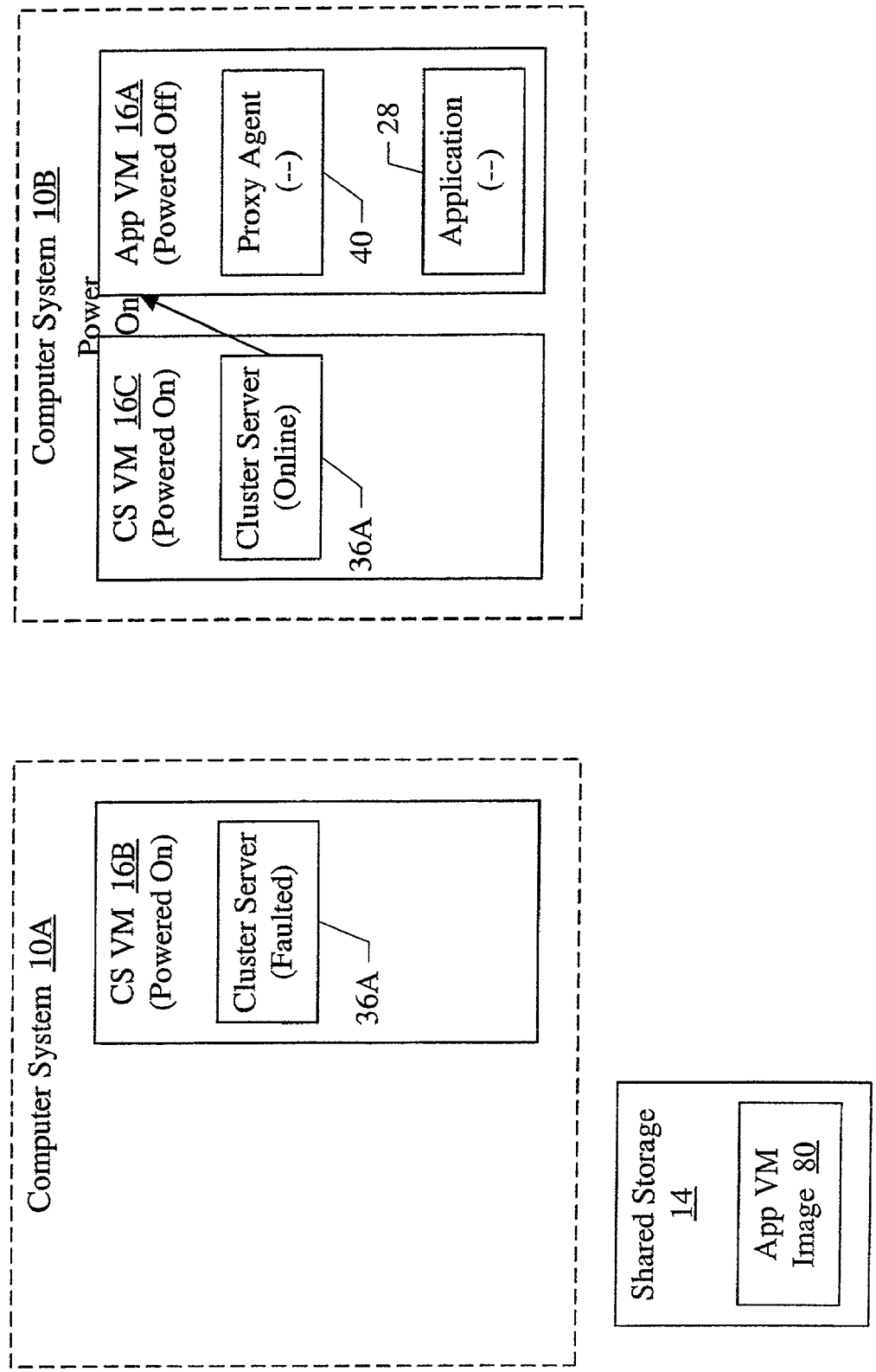
Figure 10:
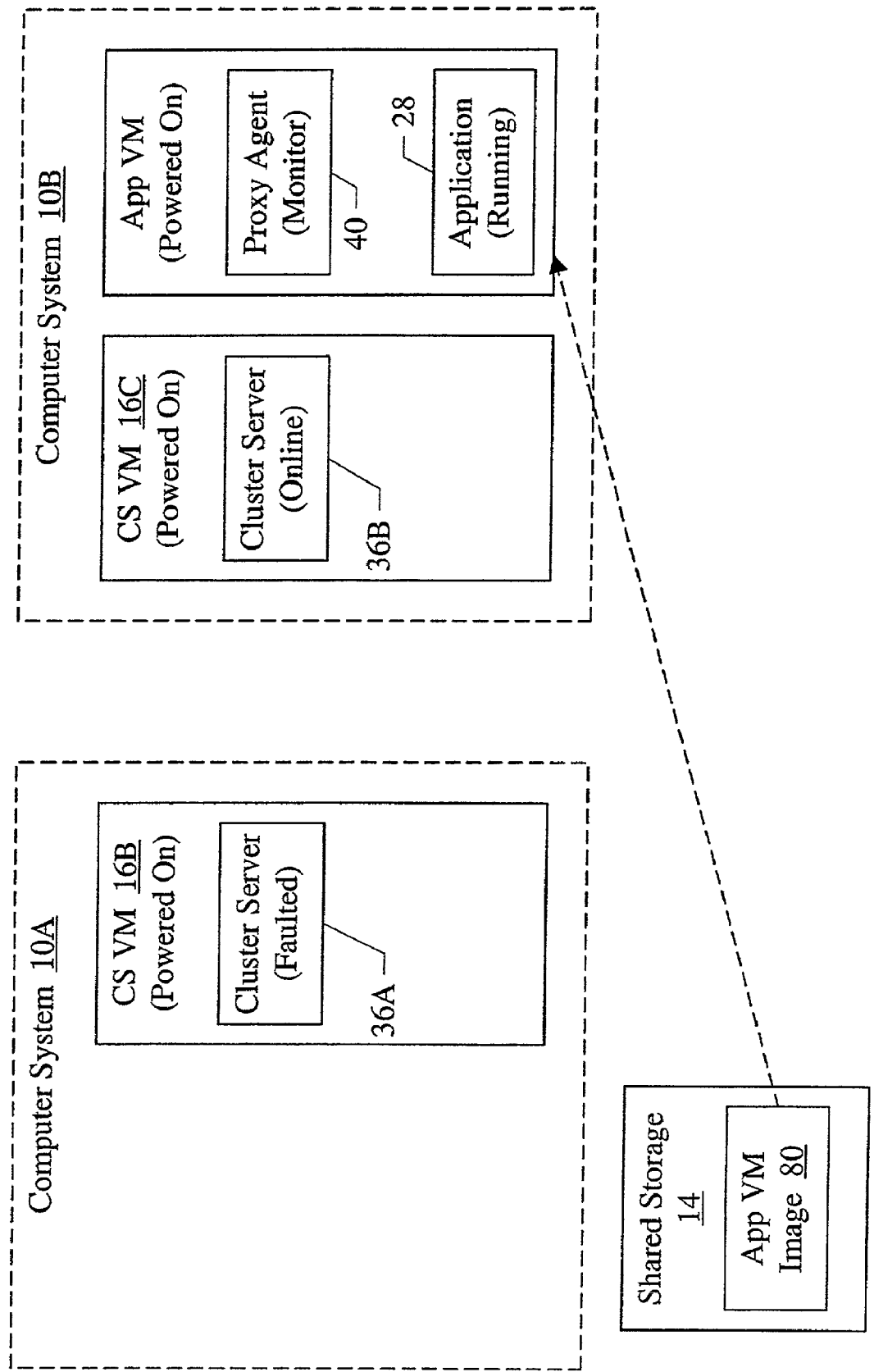

FIG. 8 illustrates the virtual machine 16A powered off, and an image 80 of the virtual machine 16A stored on the shared storage device 14. The cluster server 36A has transitioned to the cleared state, and transmits a failover message to the cluster server 36B. The cluster server 36A then transitions to the faulted state 76 (FIG. 9), and the cluster server 36B transitions to the online state 72. The cluster server 36B transmits a power on message to the virtual machine 16A (which is shown in a powered off state in FIG. 9, but may generally not exist in the computer system 10B yet). As part of powering on the virtual machine 16A on the computer system 10B, the computer system 10B reads the image 80 of the virtual machine 16A from the shared storage device 14 (FIG. 10) and resumes the virtual machine 16A. As mentioned previously, the image 80 may be selected from one of several images of the virtual machine 16A that may be stored on the shared storage device 14, in some embodiments. The virtual machine 16A activates on the computer system 10B, with the application 28 in the running state 66 and the proxy agent 40 in the monitor state 60.

It is noted that, while the above description has referred to a cluster of computer systems managed by cluster server software, other embodiments may failover virtual machines containing applications from one computer system to another without configuring the computer systems into clusters. For example, software may be executed on a first computer system including a first virtual machine in which a first application executes. The software may monitor the first application and the first virtual machine to detect failures, and may cause the failover to another computer system. Alternatively, the software may executed on a second computer system separate from the first computer system. Still further, the failover may be a manual process performed by a user.

It is further noted that, while the above examples have shown one application executing in each virtual machine, a given virtual machine may include one or more applications, as desired.

Figure 11:
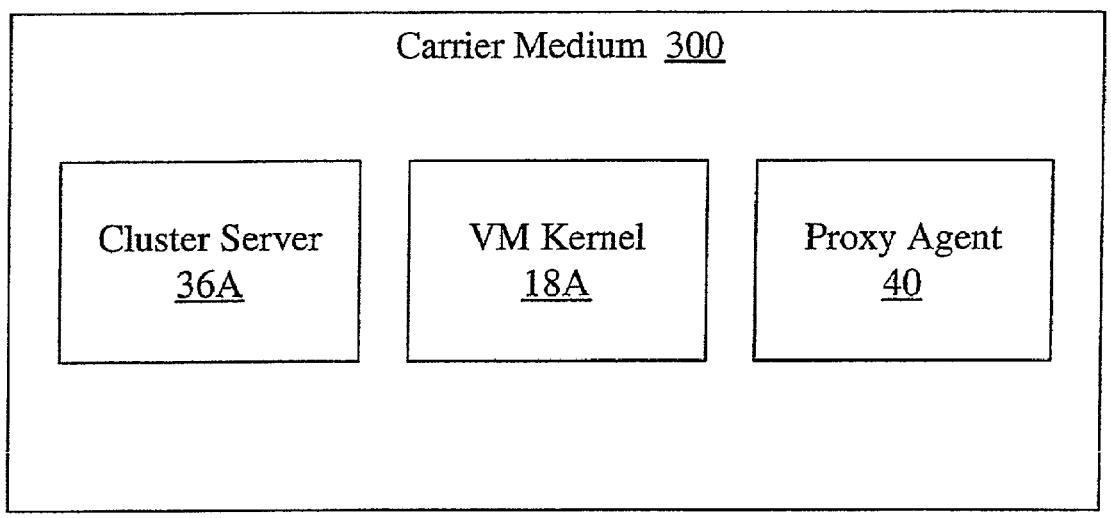
FIG. 11 is a block diagram of a carrier medium.

Turning next to FIG. 11, a block diagram of a carrier medium 300 including one or pieces of software described above is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

As illustrated in FIG. 11, the carrier medium 300 may store one or more of the cluster server 36A, the VM kernel 18A, or the proxy agent 40. In other embodiments, the application 28 may also be stored, as may be the O/S 30 and any other software. Generally, as used herein, software comprises one or more instructions which, when executed, performs the function described for the software. The instructions may be machine level instructions from an instruction set implemented in the virtual CPU 32 or the CPU 22, or may be higher level instructions (e.g. shell scripts, interpretive languages, etc.).

Numerous variations and modifications will become apparent to those skilled in the art once the above disclosure is fully appreciated. It is intended that the following claims be interpreted to embrace all such variations and modifications.

What is claimed is:

1. An apparatus comprising:
a first computer system configured to execute, in a first virtual machine, a first application and an operating system on which the first application is designed to execute; and
a second computer system coupled to the first computer system, wherein, in response to a failure on the first computer system, the first virtual machine is failed over to the second computer system, wherein the second computer system is coupled to receive a message requesting the failover, and wherein the second computer system is configured to obtain an image of the first virtual machine, and wherein the second computer system is configured to begin executing the first virtual machine from the image responsive to receiving the message requesting the failover;
wherein the first computer system is further configured to execute a second application in a second virtual machine, the second application configured to initiate the failover of the first virtual machine to the second computer in response to the failure, and wherein the second application is configured to transmit the message.

2. The apparatus as recited in claim 1 further comprising a storage device coupled to the first computer system and the second computer system, wherein failing over the first virtual machine includes the first computer system storing the image of the first virtual machine on the storage device and the second computer system reading the image of the first virtual machine from the storage device.

3. The apparatus as recited in claim 2 wherein the storage device stores a plurality of images of the first virtual machine, and wherein one of the plurality of images is selected as the image read by the second computer system.

4. The apparatus as recited in claim 2 wherein the second computer system is configured to activate the first virtual machine.

5. The apparatus as recited in claim 1 wherein the first virtual machine further includes an agent configured to monitor the first application and to communicate with the second application to detect the failure.

6. The apparatus as recited in claim 1 wherein the second computer system is further configured to execute the second application in a third virtual machine, and wherein the second application comprises instructions which, when executed, activate the first virtual machine on the second computer system.

7. The apparatus as recited in claim 6 wherein the second application on the second virtual machine is configured to transmit the message to the second application on the third virtual machine to indicate that the first virtual machine is to be activated on the second computer system.

8. A storage medium storing first instructions which, when executed, initiate a failover of a first virtual machine in which an application and an operating system executes during use, wherein the application is designed to execute on the operating system, and wherein the failover occurs from a first computer system on which a failure occurs to a second computer system, wherein the first instructions initiating the failover comprise instructions which, when executed, transmit a message requesting the failover to the second computer system to cause the second computer system to begin executing the first virtual machine from an image of the first virtual machine, and wherein the first instructions execute within a second virtual machine during use, the second virtual machine executing on the first computer system during use.

9. The storage medium as recited in claim 8 further storing second instructions which execute within the first virtual machine during use, and wherein the second instructions, when executed, monitor the application and communicate with the first instructions to detect the failure.

10. The storage medium as recited in claim 8 wherein the first instructions initiating the failover includes causing the image of the first virtual machine to be written to a storage accessible to both the first computer system and the second computer system.

11. The storage medium as recited in claim 10 further storing third instructions which, when executed, start the first virtual machine on the second computer system from the image on the storage responsive to the message from the first instructions.

12. The storage medium as recited in claim 11 wherein the third instructions execute within a third virtual machine on the second computer system during use.

13. A computer-implemented method comprising:
detecting a failure in a first virtual machine on a first computer system, wherein the first virtual machine comprises an application and an operating system on which the application is designed to execute;

sending a message requesting a failover to a second computer system, wherein the detecting and the sending are performed by a second application executing on a second virtual machine on the first computer system; and failing over the first virtual machine to the second computer system in response to the detecting and in response to the second computer system receiving the message requesting the failover.

14. The method as recited in claim 13 wherein the failing over comprises:

storing an image of the first virtual machine from the first computer system on a storage accessible to both the first computer system and the second computer system; and reading the image from the storage into the second computer system.

* * * * *